(12) United States Patent
Simpson

(10) Patent No.: US 6,474,930 B1
(45) Date of Patent: Nov. 5, 2002

(54) HAND TRUCK FOR MOVING 3 POINT HITCH EQUIPMENT

(76) Inventor: James S. Simpson, 779 Long Corner Rd., Mount Airy, MD (US) 21771

( * ) Notice: Subject to any disclaimer, the term of this patent is extended or adjusted under 35 U.S.C. 154(b) by 0 days.

(21) Appl. No.: 09/712,983

(22) Filed: Nov. 16, 2000

Related U.S. Application Data

(60) Provisional application No. 60/189,057, filed on Mar. 14, 2000.

(51) Int. Cl.$^7$ .................................................. B62B 1/00
(52) U.S. Cl. ...................... 414/490; 269/17; 280/47.19; 414/920; 414/444
(58) Field of Search ................................ 414/589, 590, 414/444, 490, 446, 607, 457, 920; 280/47.17, 47.18, 47.24, 47.19, 47.34, 47.35, 47.31; 269/17

(56) References Cited

U.S. PATENT DOCUMENTS

| | | | |
|---|---|---|---|
| 2,620,610 A | | 12/1952 | Chambers |
| 2,903,147 A | * | 9/1959 | Davis, Jr. .................. 414/490 |
| 2,996,307 A | | 8/1961 | Debailleux |
| 3,045,851 A | | 7/1962 | Rupert |
| 3,100,048 A | | 8/1963 | Halverson |
| 3,208,614 A | | 9/1965 | Armitage et al. |
| 4,065,013 A | * | 12/1977 | Orthman ..................... 414/607 |
| 4,183,511 A | * | 1/1980 | Marek ......................... 269/17 |
| 4,239,196 A | * | 12/1980 | Hanger ........................ 269/17 |
| 4,281,957 A | * | 8/1981 | Vishe et al. ................ 414/457 |
| 4,537,421 A | | 8/1985 | Teachout |
| 4,570,958 A | | 2/1986 | Walker |
| 4,637,769 A | | 1/1987 | Thorndike |
| 5,373,593 A | * | 12/1994 | Decky et al. ............. 269/17 X |
| 6,059,512 A | * | 5/2000 | Kielinski .................... 414/490 |
| 6,135,446 A | * | 10/2000 | Irwin ..................... 414/490 X |

FOREIGN PATENT DOCUMENTS

FR 2616398 12/1998

* cited by examiner

Primary Examiner—Frank E. Werner
(74) Attorney, Agent, or Firm—Richard C. Litman

(57) ABSTRACT

A wheeled hand truck adapted to carry lightweight three-point tractor hitch equipment. The hand truck has a frame made from two vertical rails, a handle, and some transverse ribs. An axle and a pair of wheels serve as the pivot point of the frame when the device is lifting objects. An extensible, upper support arm has a near end that is pivotally mounted to an upper rib. The support arm pivots up and down along a vertical plane, and has an apertured far end for attaching to the upper point of a three-point hitch connection. The hand truck also has a pair of lower lift arms that pivot from side to side along a substantially horizontal plane so as to be adjustably connectable to the lower two points of a three-point hitch connection.

3 Claims, 5 Drawing Sheets

HAND TRUCK FOR MOVING 3 POINT HITCH EQUIPMENT

CROSS-REFERENCE TO RELATED APPLICATION

This application claims the benefit of U.S. Provisional Patent Application Serial No. 60/189,057, filed Mar. 14, 2000.

BACKGROUND OF THE INVENTION

1. Field of the Invention

The present invention relates generally to hand trucks. More specifically, the invention is a hand truck for moving lightweight three-point hitch farm implements.

2. Description of Related Art

The relevant art of interest describes various hand trucks for moving lightweight, three-point hitch farm implements without requiring the use of a tractor. The relevant art will be discussed in the order of perceived relevance to the present invention.

U.S. Pat. No. 3,045,851, issued in July 1962 to D. C. Rupert, describes an outboard motor lift cart having two upper clamps and a lower stand. Rupert does not teach the present invention as claimed.

U.S. Pat. No. 3,208,614, issued in September 1965 to F. E. Armitage, et al., describes a can carrier. Armitage et al. do not teach the present invention as claimed.

U.S. Pat. No. 4,570,958, issued on Feb. 18, 1986 to Brooks Walker, describes a personal luggage carrier. Walker does not teach the present invention as claimed.

U.S. Pat. No. 2,620,610, issued in December 1952 to J. M. Chambers, describes a transport apparatus for use with a tractor-connected implement. Chambers does not teach the present invention as claimed.

U.S. Pat. No. 2,996,307, issued in August 1961 to L. P. DeBailleux, describes a three-wheeled implement transporting apparatus and method. Debailleux does not teach the present invention as claimed.

U.S. Pat. No. 3,100,048, issued in August 1963 to M. L. Halverson, describes a sports equipment carrying cart. Halverson does not teach the present invention as claimed.

U.S. Pat. No. 4,537,421, issued in August 1985 to Paul H. Teachout, describes a foldable dolly. Teachout does not teach the present invention as claimed.

U.S. Pat. No. 4,637,769, issued in January 1987 to Charles E. Thorndike, describes a log carrier. Thorndike does not teach the present invention as claimed.

French Pat. Application No. 2,616,398, published on Dec. 16, 1988, describes a bale handling trolley. The '398 patent does not teach the present invention as claimed.

None of the above inventions and patents, taken either singly or in combination, is seen to describe the instant invention as claimed.

SUMMARY OF THE INVENTION

The present invention is a wheeled hand truck adapted to carry lightweight three-point hitch tractor-connectable equipment, such as a snow plow. The hand truck has a frame made from two vertical rails connected by a handle, and some transverse ribs. An axle and a pair of wheels serve as the pivot point of the frame when the device is lifting objects. The axle and wheels also permit smooth travel over rough ground when carrying a load of at least 400 pounds. An extensible, upper support arm has a near end that is pivotally mounted to an upper rib. The support arm pivots up and down along a vertical plane, and has an apertured far end for attaching to the upper point of a three-point hitch connection. The hand truck also has a pair of lower lift arms that pivot from side to side along a substantially horizontal plane so as to be adjustably connectable to the lower two points of a three-point hitch connection.

It is a principle object of the invention to provide a light-weight human-powered hand truck that will spare a tractor from unnecessary wear and tear, that has excellent maneuverability in tight spaces, and that makes it easy for a single person to move relatively heavy tractor implements, such as plows, blades, etc.

It is an object of the invention to provide a hand truck having an upper support arm that is vertically pivotable and has an adjustable length for attaching to the upper link of a three-point hitch.

It is a further object of the invention to provide a hand truck having a pair of lower lift arms that are laterally pivotable for attachment to the lower two links of a three-point hitch, and that are lockable when attached to the equipment.

Still another object of the invention is to provide a hand truck with a pair of large, air pressurized wheels and capable of carrying heavy loads.

It is an object of the invention to provide improved elements and arrangements thereof in an apparatus for the purposes described which is inexpensive, dependable and fully effective in accomplishing its intended purposes. These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
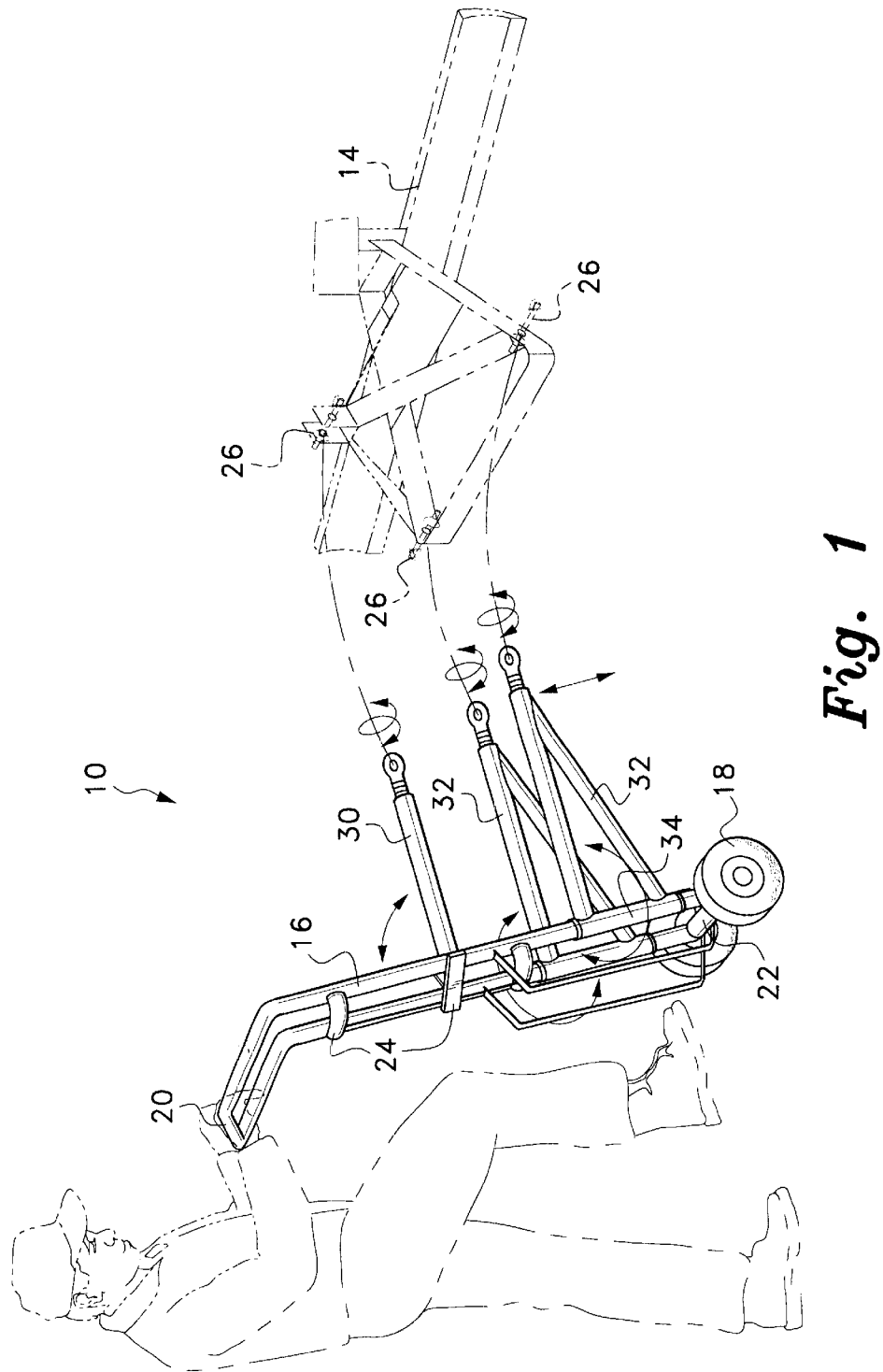
FIG. 1 is an environmental, perspective view of a first embodiment of a hand truck for moving three-point tractor hitch equipment according to the present invention.
Figure 2:
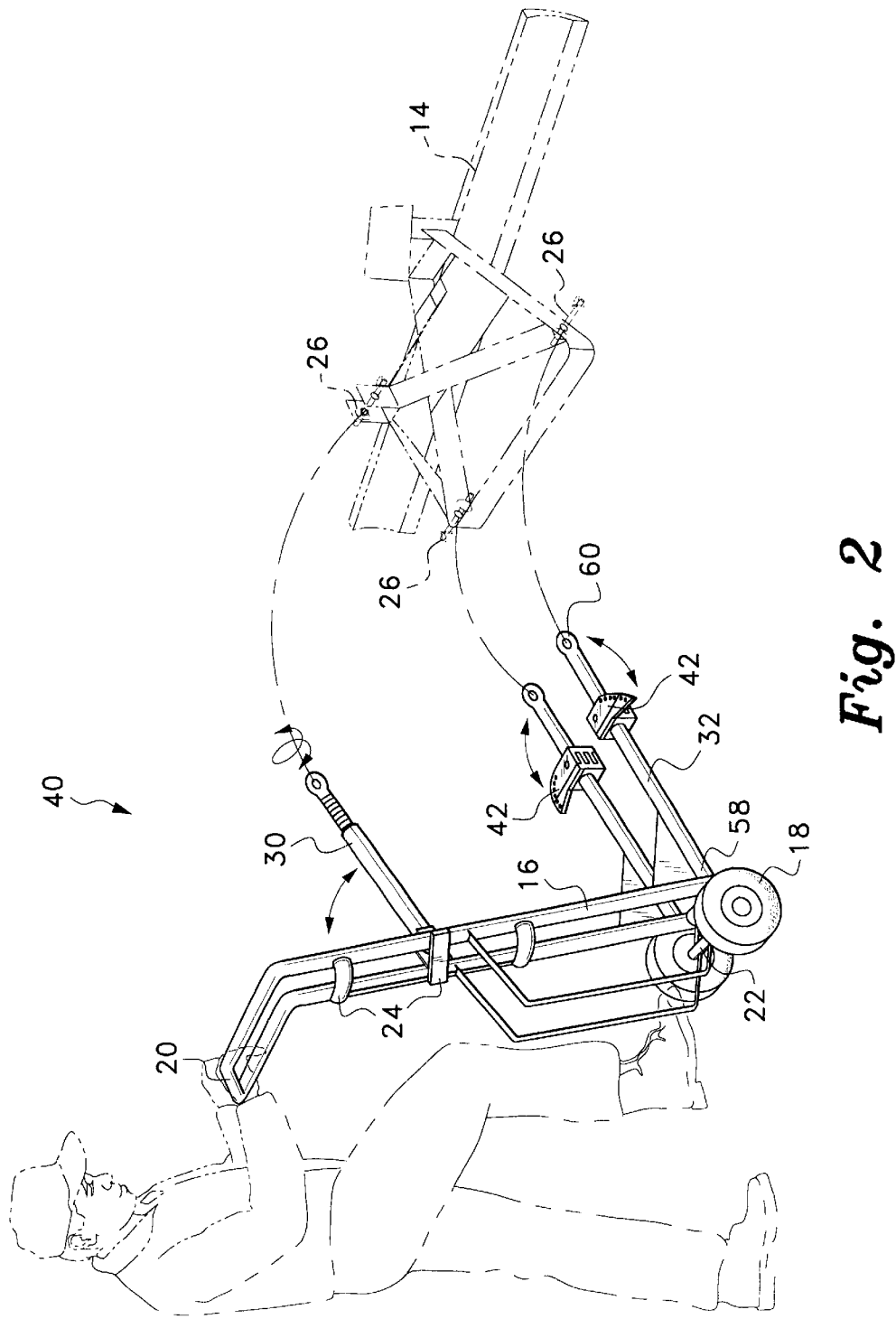
FIG. 2 is an environmental, perspective view of a second embodiment of a hand truck for moving three-point tractor hitch equipment according to the present invention.
Figure 4:
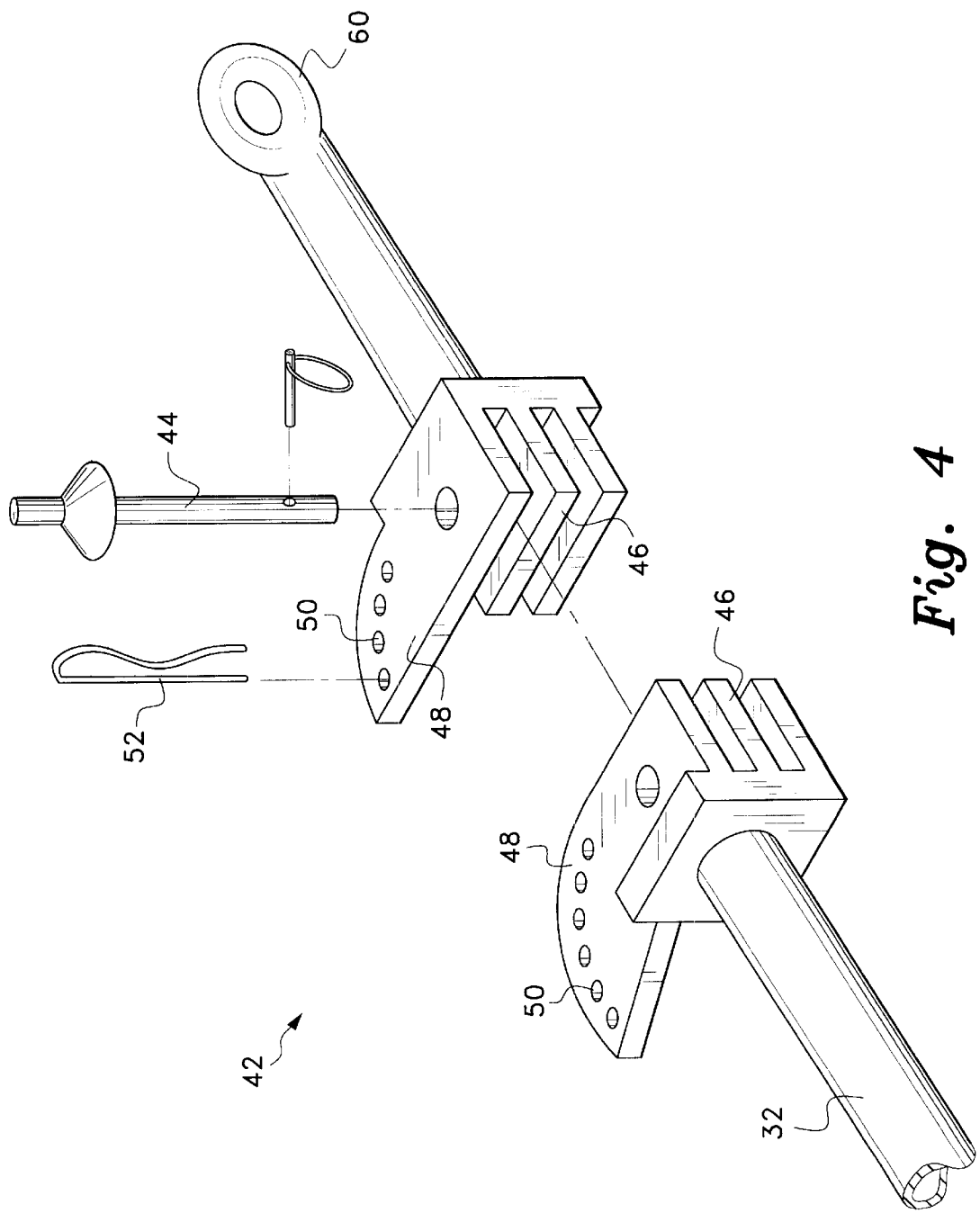
FIG. 4 is an exploded, environmental perspective view of the lift arm hinges of the second embodiment shown in FIG. 2.
Figure 5:
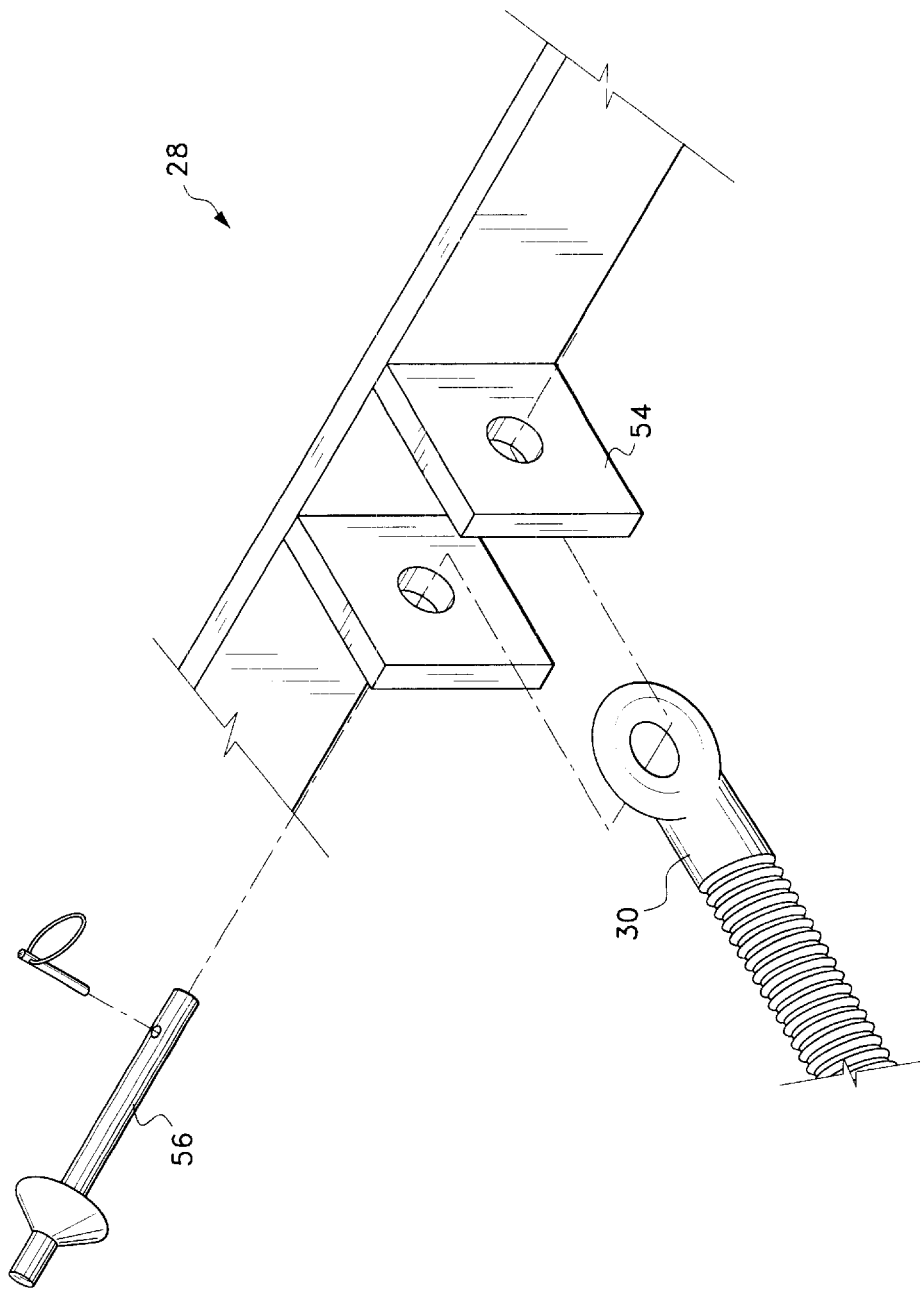
FIG. 5 is an exploded, environmental perspective view of the mount for the upper support arm of the hand truck according to the present invention.

The present invention is directed to a versatile hand truck adapted to carry lightweight 3-point tractor hitch equipment 14. FIGS. 1 and 2 show a first and a second embodiment, respectively, of the hand truck. FIG. 4 is an exploded view of the lift arm joint of the second embodiment, and FIG. 5 is an exploded view of the upper support arm mount appearing in each embodiment.

Hand truck 10 includes two substantially vertical, parallel rails 16, each of rails 16 having a top end, a bottom end, a forward side, and a back side. A handle 20 connects rails 16 at the top end. A two-wheeled axle 22 is attached to rails 16 proximate to the bottom end of the back side of rails 16. Axle 22 serves as the pivot point for the frame when the device is lifting objects. The wheels preferably contain air-filled tires 18, and the wheels and axle 22 are preferably strong enough to support at least 400 pounds. A plurality of ribs 24 are connected in transverse orientation to, and disposed in parallel succession from, the bottom end to the top end of rails 16. Preferably there are three ribs, although any suitable number of ribs that satisfies the requirements for lateral support of rails 16, and for loads ranging from about four hundred pounds to about 800 pounds, would be sufficient.

An upper support arm mount 28 (shown in FIGS. 3 and 5) is disposed on an upper one of ribs 24, midway between rails 16. The -mount 28 supports an elongated upper support arm 30 having a near end that is pivotally attached to mount 28. Support arm 30 also has an extendable far end attachable to a three-point hitch 26 on tractor implement 14. As best shown in FIG. 5, mount 28 preferably comprises two parallel plates 54 and a pin 56 insertable through apertures defined in plates 54 and a ring at the end of support arm 30. Support arm 30 is made extendable by providing the arm in two sections, including a hollow tubular first section attached to mount 28 which is internally threaded, and a second section having one end which is threaded to engage the first section and having a ring or other means for attachment to the hitch 14 at the other end, the length of support arm 30 being adjusted by the degree to which the second section is engaged in the first section. Hand truck 10 also includes a pair of elongated lower lift arms 32. As shown in FIG. 2, each of lift arms 32 has a first end 58 attached to the bottom end of rails 16, and an extendable second end 60 attachable to a three-point hitch 26 on tractor implement 14.

In operation, support arm 30 rotates up to 180 degrees within a vertical plane extending from the forward side of rails 16. Having a plane of rotation substantially normal to that of support arm 30, lift arms 32 rotate up to 180 degrees about rails 16 within a substantially horizontal plane extending from the forward side.

Figure 3:
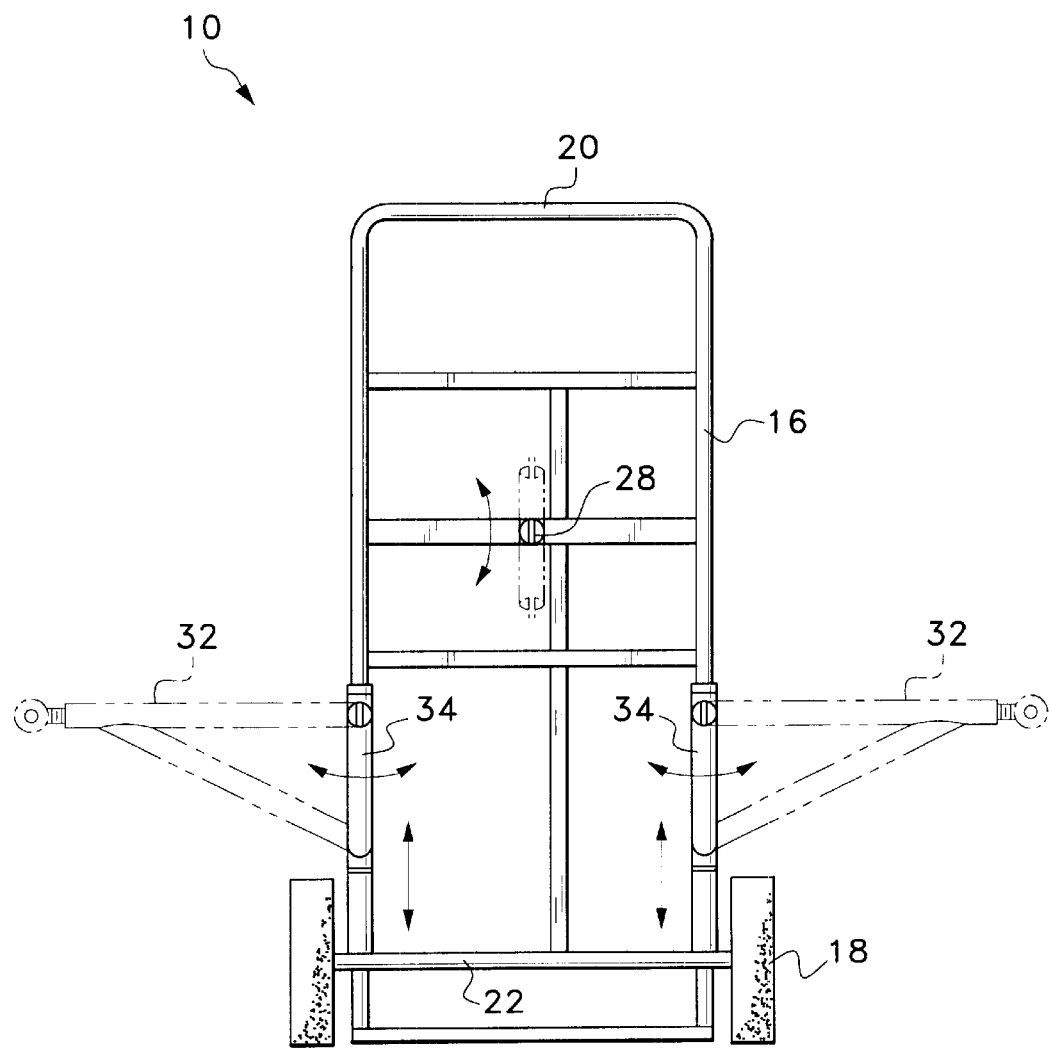
FIG. 3 is a front view of the hand truck.

FIGS. 1 and 3 show a first embodiment of hand truck 10. In this first embodiment, first end 58 of lift arms 32 is a hollow cylindrical sleeve 34 that rotates about, and on a plane substantially perpendicular to, rails 16. Each lift arm 32 has a rigid, triangular configuration, the base of the triangle being defined by sleeve 34. In this embodiment the length of the lift arms 32 is adjustable by providing the apex of the triangle with an internally threaded hollow tube in which a threaded rod member having a ring or other means for attachment to the hitch is disposed.

FIGS. 2 and 4 show a second embodiment 40 of the hand truck 10 presenting a slight modification to the structure of lift arms 32. In this second embodiment, each of lift arms 32 has a pivoting hinge 42 disposed between first end 58 and second end 60 of lift arms 32, and defining a lift attachment member between said hinge 42 and said second end 60. Pivoting hinge 42 includes at least one pivot pin 44 extending through body 46. Hinge 42 also includes an upper flange 48. Flange 48 has formed therethrough a plurality of hinge pin holes 50, one of which receives a hitch or hinge pin 52. Hinge pin 52 serves to lock hinge 42 such that lift arms 32 maintain a precise angle with respect to tractor implement 14. The hand truck 10 may further include a generally triangular shaped, planar, support element extending between a respective rail 16 and the lower lift arm 32 connected thereto, substantially as shown.

It is to be understood that the present invention is not limited to the sole embodiment described above, but encompasses any and all embodiments within the scope of the following claims.

I claim:

1. A hand truck apparatus adapted for carrying an implement equipped with a three-point hitch, comprising:

two substantially vertical, parallel rails, each of said rails having a top end, a bottom end, a forward side, and a back side;

a handle connecting said rails at said top end;

a two-wheeled axle attached to said rails proximate said bottom end;

a plurality of ribs transverse to and connecting said rails, said plurality of ribs disposed in parallel succession between said bottom end and said top end;

an elongated upper support arm having a tubular, internally threaded first section pivotally attached about a horizontal axis to one of said plurality of ribs, and having a second section including an externally threaded rod extendable from the first section and a ring at an end of the rod adapted for attachment to a center link of the three-point hitch;

a pair of elongated lower lift arms, each of said lower lift arms having:

a sleeve rotatably disposed about a vertical axis on the bottom end of said rails;

an elongated, internally threaded tube extending transversely from said sleeve; and a threaded rod extensible from said internally threaded tube, the rod having a ring adapted for attachment to an end link of the three-point hitch;

wherein said support arm is rotatable up to 180 degrees in a vertical plane extending from said forward side, and wherein said lift arms are rotatable up to 180 degrees in a substantially horizontal plane extending from said forward side.

2. The hand truck apparatus according to claim 1, wherein the first section of said upper support arm has an end having a pivot ring disposed thereon, the hand truck further comprising:

an upper support arm mount attached to one of said ribs, the mount having two parallel plates, said plates having apertures defined therein; and, a pin inserted through said aligned apertures in said plates and through said pivot ring, the pin defining the horizontal axis about which said upper support arm rotates.

3. The hand truck apparatus according to claim 1, wherein each said lower lift arm further comprises a strut extending diagonally between said sleeve and said internally threaded tube;

whereby said sleeve, said internally threaded tube and said strut form a triangular shape for preventing bending of said lift arm.

* * * * *